(12) United States Patent
Lin et al.

(10) Patent No.: US 9,546,875 B2
(45) Date of Patent: Jan. 17, 2017

(54) BEACON DEVICE AUTOMATIC IDENTITY RECOGNITION METHOD

(71) Applicants: KINPO ELECTRONICS, INC., New Taipei (TW); CAL-COMP ELECTRONICS & COMMUNICATIONS COMPANY LIMITED, New Taipei (TW)

(72) Inventors: Chuan-Kai Lin, New Taipei (TW); Tung-Yun Hsieh, New Taipei (TW)

(73) Assignees: KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 0 days.

(21) Appl. No.: 14/793,578

(22) Filed: Jul. 7, 2015

(65) Prior Publication Data

US 2016/0341556 A1 Nov. 24, 2016

(30) Foreign Application Priority Data

May 21, 2015 (TW) .............................. 104116208 A (51) Int. Cl.
| | |
|---|---|
| *G01C 22/00* | (2006.01) |
| *G05B 15/00* | (2006.01) |
| *B60T 7/16* | (2006.01) |
| *G01C 21/20* | (2006.01) |
| *G05D 1/02* | (2006.01) |
| *H04W 4/04* | (2009.01) |
| *H04W 8/00* | (2009.01) |

(52) U.S. Cl.
CPC ........... *G01C 21/206* (2013.01); *G05D 1/0276* (2013.01); *H04W 4/043* (2013.01); *H04W 8/005* (2013.01)

(58) Field of Classification Search
USPC ............................. 701/23; 700/258; 180/169
See application file for complete search history.

(56) References Cited

U.S. PATENT DOCUMENTS

2007/0042716 A1* 2/2007 Goodall ................ H04W 16/18
455/67.11
2007/0250212 A1* 10/2007 Halloran ................... A47L 5/30
700/245

(Continued)

OTHER PUBLICATIONS

Office Action dated May 10, 2016 of the corresponding Taiwan patent application.

*Primary Examiner* — Tyler Paige
(74) *Attorney, Agent, or Firm* — Chun-Ming Shih; HDLS IPR Services (57) ABSTRACT

An automatic identity recognition method used for a robot and a plurality of beacon devices is disclosed. The robot has a tag device. After the robot is started, the tag device enters into a discovery mode and broadcasts a blinking message externally. Each of the plurality of beacon devices respectively replies an initial message including its own anchor ID to the tag device if receiving the blinking message. After receiving the initial message, the tag device records the anchor ID of the initial message into a configuration list, and replies a control command to the beacon device who replies the initial message, so as to control the beacon device not to reply the initial message continually.

10 Claims, 5 Drawing Sheets

(56) References Cited

U.S. PATENT DOCUMENTS

| | | | |
|---|---|---|---|
| 2008/0039974 A1* | 2/2008 | Sandin | G05D 1/028 |
| | | | 700/258 |
| 2008/0076398 A1 | 3/2008 | Mate et al. | |
| 2012/0072106 A1 | 3/2012 | Han et al. | |
| 2013/0261867 A1* | 10/2013 | Burnett | G05D 1/0272 |
| | | | 701/23 |
| 2014/0207280 A1* | 7/2014 | Duffley | G05D 1/0016 |
| | | | 700/257 |
| 2014/0207282 A1* | 7/2014 | Angle | H04L 12/282 |
| | | | 700/257 |
| 2015/0328775 A1* | 11/2015 | Shamlian | B25J 9/1676 |
| | | | 700/258 |
| 2016/0100521 A1* | 4/2016 | Halloran | A01D 34/008 |
| | | | 180/169 |
| 2016/0100522 A1* | 4/2016 | Yamauchi | A01D 34/008 |
| | | | 701/25 |

\* cited by examiner

BEACON DEVICE AUTOMATIC IDENTITY RECOGNITION METHOD

TECHNICAL FIELD

The technical solution relates to beacon devices and more particularly relates to recognition of beacon devices.

BACKGROUND

Beacon technology is a popular wireless technology recently. Generally, multiple beacon devices may detect relative locations or relative distance via wireless communication technology. The wireless communication technology may refer to Bluetooth Low Energy (BLE), Ultra Wide Band (UWB) or any other applicable technology. If a user brings a beacon device like a smart phone supporting beacon technology, when the user triggers an application on the smart phone, multiple beacon devices may respectively detect the location of the user and provide corresponding push messages to the smart phone. Moreover, with the feature of location detection via multiple beacon devices, there is a technical solution in the market for disposing multiple beacon devices in an indoor space to provide indoor navigation with the multiple beacon devices.

When the indoor navigation is applied on a robot like a cleaning robot or a monitoring robot and the robot is moving in the indoor space, the multiple beacon devices are used to navigate the robot. The robot has a first beacon device inside and there are multiple second beacon devices disposed in the indoor space. The first beacon device is recorded with multiple anchor identifications (IDs) of the multiple second beacon devices. In convention art, the first beacon device may only perform distance detection procedure with the multiple second beacon devices corresponding to the anchor IDs recorded in the first beacon device in a ranging phase and may obtain locations of the multiple second beacon devices. In other words, the robot may only use the multiple beacon devices previously recorded to perform the indoor navigation. If anchor IDs of one or more than one second beacon devices are not recorded in the first beacon device, it is not capable of providing navigation for the robot.

When such robots are sold in the market, because the manufacturers do not know neither how many and which beacon devices will be disposed in an indoor space nor anchor IDs of disposed beacon devices, necessary anchor IDs cannot be recorded in such robot in advance. Therefore, it is beneficial to design a method for configuring robots and multiple beacon devices easily without complicated procedure.

SUMMARY

The following solutions relate to beacon device automatic identity recognition methods. In such solutions, when searching beacon devices nearby, the tag device does not repeatedly receive replied messages from a most near beacon device. Otherwise, the bandwidth of the tag device is crowded and the tag device is slowed down for its processing speed and thus the tag device cannot receive and process replied messages from other beacon devices so as fails to search other beacon devices successfully and records their corresponding anchor IDs during a predetermined time period.

In an embodiment, the tag device is disposed in a robot. When the robot is started, the tag device enters a discovery mode and broadcasts a blinking message. After a beacon device receives the blinking message, the beacon device replies an initial message containing an anchor ID of the beacon device. When the tag device receives the initial message, the anchor ID in the initial message is recorded in an internal configuration list and a control command is sent to the beacon device to instruct the beacon device to enter a sleep mode so that stop sending the initial message again. When the configuration list has sufficient number of anchor IDs more than a threshold number, the tag device may separately perform a ranging phase with multiple beacon devices corresponding to the multiple anchor IDs. After the ranging phase is over, the robot starts to move and is navigated by the tag device and the multiple beacon devices.

Such solution at least include following technical advantages. When the tag device receives the initial messages replied from a first beacon device and records the anchor ID of the first beacon devices, the first beacon device is instructed to enter the sleep mode temporarily. As such, the tag device does not repeatedly receive the initial messages from the first beacon devices within a predetermined time period.

As such, the wireless bandwidth is not occupied by the initial message repeatedly sent by the first beacon device and thus the tag device may successfully receive initial messages from other surrounding beacon devices.

Moreover, with such solution, the tag device does not receive initial messages from beacon devices with anchor IDs already recorded within the predetermined time period, and thus the tag device has sufficient time for processing initial messages from other beacon devices and records their anchor IDs. In other words, the tag device may quickly complete recording of anchor IDs of surrounding beacon devices.

DETAILED DESCRIPTION

Several preferred embodiments are explained with associated drawings as follows.

Figure 1:
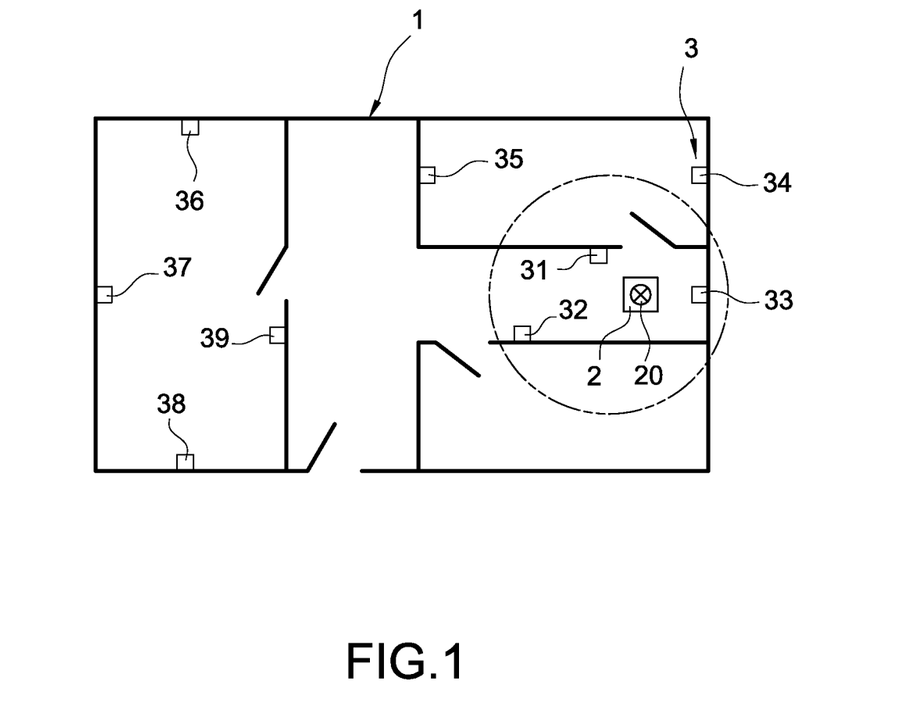
FIG. 1 is an indoor space diagram according to a first embodiment.

Please refer to FIG. 1, which illustrates an indoor space of a first embodiment. A beacon device automatic identity recognition method is disclosed and used between a robot 2 and multiple beacon devices 3. The robot 2 may refer to a robot located in an indoor space 1 and operates in the indoor space 1. For example, the robot 2 may be a cleaning robot for cleaning the indoor space 1, a monitoring robot for carrying cameras and monitoring the environment of the indoor space 1, or a carrying robot for carrying objects within the indoor space 1. The robot 2 may also be any other robot and is not limited to the listed examples.

The multiple beacon devices 3 are respectively located in different locations in the indoor space 1. In the embodiment of FIG. 1, there is a first beacon device 31, a second beacon device 32, a third beacon device 33, a fourth beacon device 34, a fifth beacon device 35, a sixth beacon device 36, a seventh beacon device 37, an eighth beacon device 38 and a ninth beacon device 39. Nevertheless, please be noted that this is only an example and there may be other alternative ways to implement the solution.

A tag device 20 is disposed in the robot 2. In this example, the tag device 20 and the multiple beacon devices 3 refer to same type devices that both support beacon technology and perform wireless transmission via Ultra Wide Band (UWB) to further confirm relative locations to each other. Because the tag device 20 and the multiple beacon devices 3 are disposed in different places and used for achieving different functions, different terms are used for eliminating ambiguity but such definition should not be regarded as limitation of the scope of the solution.

In the following embodiment, the tag device 20 and the multiple beacon devices 3 that communicate via UWB technology for performing wireless transmission are used for explanation. Nevertheless, the tag device 20 and the multiple beacon devices 3 may also perform wireless transmission via Bluetooth Low Energy (BLE) or other technology and these examples should not be regarded as limitation of these solutions.

As illustrated in FIG. 1, a major objective of the embodiment is to provide indoor navigation for the robot 2 via the multiple beacon devices 3 so that when the robot 2 is moving within the indoor space 1, the robot 2 knows where it is currently located so as to complete the assigned tasks like cleaning, monitoring, or object carrying, efficiently.

In this embodiment, a user may acquire the multiple beacon devices 3 and select locations of the multiple beacon devices by herself. In this embodiment, when the robot 2 is started at first time, the tag device 20 is used for searching surrounding multiple beacon devices 3 and performing a ranging procedure with the multiple beacon devices 3 to obtain the locations of the multiple beacon devices 3. As such, after the robot 2 starts moving, the tag device 20 and the multiple beacon devices 3 are used for performing indoor navigation of the robot 2.

Figure 2:
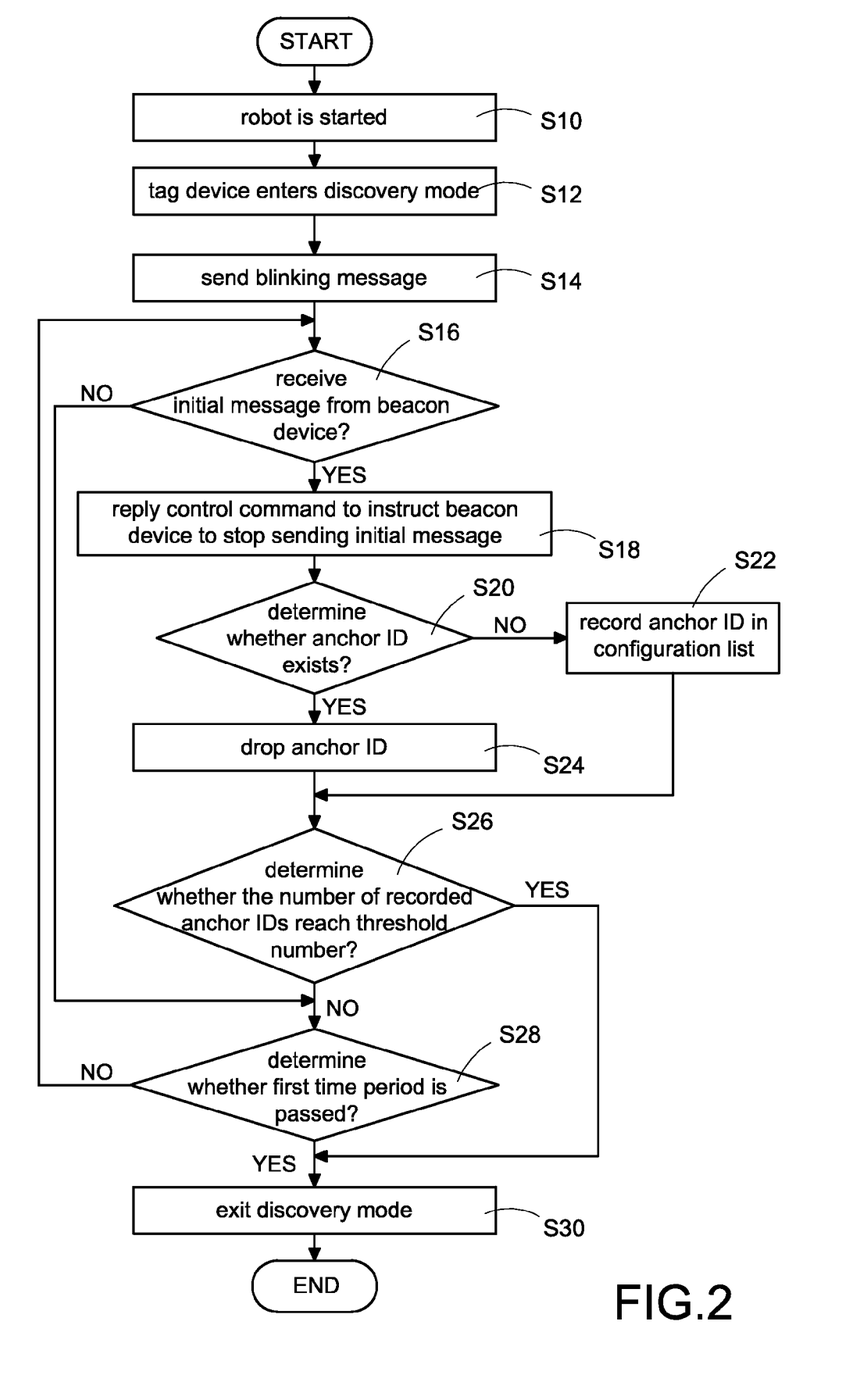
FIG. 2 is an automatic identity recognition flowchart according to the first embodiment.

Please also refer to FIG. 2, which is an automatic identity recognition flowchart according to the first embodiment. Firstly, the robot 2 is operated to start (step S10) and the robot 2 triggers its internal tag device 20 to enter a discovery mode (step S12). Specifically, after the robot 2 is started for the first time, the tag device 20 does not recognize any beacon device 3 in the indoor space 1 or amount of the beacon devices 3 and thus it is not able to navigate for the robot 2. To solve this technical problem, the solution uses a discovery mode to find one or more than one beacon devices 3 surrounding the robot 2.

When the tag device 20 enters the discovery mode, the tag device 20 sends a blinking message outwardly (step S14). The blinking message may only be received by the multiple beacon devices 3 that are the same type of the tag device 20 and support beacon technology. In this embodiment, the tag device 20 mainly uses broadcasting technology to send the blinking message. As such, only one or more beacon devices 3 within a valid broadcasting transmission range of the broadcasting as illustrated as dashed circle in FIG. 1 may receive the blinking message. In the embodiment illustrated in FIG. 1, the tag device 20 broadcasts the blinking message and only the first beacon device 31, the second beacon device 32 and the third beacon device 33 may receive the blinking message.

In this example, the blinking message includes an instruction querying an anchor ID. When the multiple beacon devices 3 receive the blinking message, they reply initial messages. The initial messages at least include anchor IDs corresponding to the beacon devices 3. Please be noted that the anchor IDs are set during manufacturing the beacon devices 3 but such configuration should not be regarded as limitation for the solution.

After the step S14, the tag device 20 determines whether a replied initial message from one of the multiple beacon devices 3 is received (step S16). When the tag device 20 does not receive any initial message, it is counted whether a first time period is passed (step S28), and continuously determine whether any initial message is received before the first time period is passed.

If the tag device 20 receives any replied initial message from the multiple beacon devices 3, the tag device 20 immediately sends a control command to the beacon device that sends the initial message so that the beacon device 3 stops sending further initial message (step S18).

The beacon technology mainly uses UWB or Bluetooth technology to perform data transmission. Therefore, when two devices are closer, their data transmission time is shorter. Further, when the beacon devices 3 receive a query message like the blinking message, they are triggered and continuously reply corresponding messages like the initial message. When a specific beacon device 3 is very close to the tag device 20, the tag device 20 may continuously receive replied messages from the specific beacon device 3. In such case, the wireless bandwidth is occupied by the specific beacon device 3. This causes the problem that the tag device 20 cannot receive replied messages from other beacon devices 3.

Figure 3:
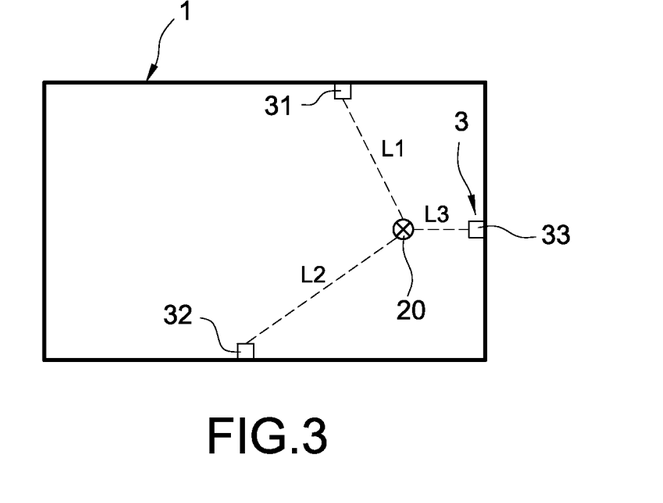
FIG. 3 is an indoor space diagram according to a second embodiment.

Please also refer to FIG. 3, which is an indoor space diagram according to a second embodiment. In the second embodiment, the valid broadcasting transmission range of the tag device 20 covers the first beacon device 31, the second beacon device 32, and the third beacon device 33. There is a first distance L1 between the tag device 20 and the first beacon device 31. There is a second distance L2 between the tag device 20 and the second beacon device 32. There is a third distance L3 between the tag device 20 and the third beacon device 33. The third distance L3 is much smaller than the first distance L1 and the second distance L2.

In the second embodiment, the three beacon devices 31-33 respectively reply their initial messages after receiving the blinking message. Specifically, the tag device 20, i.e. the robot 2, and the third beacon device 33 are very close and therefore, the tag device 20 continuously receive the replied initial message from the third beacon device 33 but unable to receive replied initial messages from the first beacon device 31 and the second beacon device 32.

In other words, because the third distance L3 is much smaller than the first distance L1 and the second distance L2, the bandwidth of the tag device 20 is occupied by the repeated initial messages from the third beacon device 33. This causes the priority of the replied initial messages from the first beacon device 31 and the second beacon device 32 staying in low priority. As such, in limited time, i.e. the time period in which the tag device 20 staying in the discovery mode, the tag device 20 may not be able to receive the replied initial messages from the first beacon device 31 and the second beacon device 32. This causes the tag device 20 unable to find the first beacon device 31 and the second beacon device 32.

To solve the problem, via the step S18 in FIG. 2, the tag device 20 immediately replies the control command after receiving the replied initial message from the third beacon device 33 so that the third beacon device 33 stops sending following initial messages. As such, the bandwidth of the tag device 20 is reserved for nearby beacon devices so that the tag device 20 may successfully receive replied initial messages from other beacon devices, like the first beacon device 31 and the second beacon device 32 in the above example, within limited time period to recognize existence of other beacon devices.

Please refer back to FIG. 2, after the step S18, the tag device 20 determines whether the anchor ID contained in the initial message already exists (step S20). Specifically, the tag device 20 has a configuration list (not shown). In the step S20, the tag device 20 determines whether the anchor ID is already recorded in the configuration list. If the configuration list does not record the anchor ID, the tag device 20 records the anchor ID in the configuration list (step S22). Otherwise, if the configuration list already records the anchor ID, the tag device 20 drops the anchor ID and does not process the initial message (step S24). As such, the tag device 20 filters found and recorded beacon device 3 without spending time on processing the same data.

Please be noted that the tag device 20 may firstly execute the step S18 before the step S20 to S24. Alternatively, the tag device 20 may execute the step S20 to S24 before the step S18. In other words, after the tag device 20 receives any replied initial message from the beacon device 3, the tag device 20 may reply the control command to the beacon device 3 or record or drop the anchor ID of the beacon device 3. Please be noted such example does not limit variations of implementation.

Next, the tag device 20 determines whether the number of the anchor IDs in the configuration list already reaches a threshold number (step S26). If the number of the anchor IDs reaches the threshold number, the tag device 20 determines that it is sufficient to use currently recorded multiple beacon devices 3 to execute the indoor navigation procedure and therefore may directly exit the discovery mode (step S30). In this embodiment, the threshold number refers to the minimal number of the beacon devices 3 necessary for the robot 2 to execute the indoor navigation procedure. Moreover, because the beacon technology uses triangular positioning to conduct an initial navigation, the threshold number is preferably set as three, but such configuration should not be regarded as a limitation.

As mentioned above, even the indoor space 1 is disposed with many beacon devices 3, when the robot 2 is started for the first time and the tag device 20 records three anchor IDs of corresponding beacon devices 3, the robot 2 may perform the ranging procedure with these recorded beacon devices 3 to obtain the locations of these beacon devices 3 and use these beacon devices 3 to conduct the indoor navigation. For other undiscovered beacon devices 3, the tag device 20 may regularly or irregularly enter the discovery mode to search other beacon devices 3 in other locations during operation. Usually, the robot 2 moves during operation.

As illustrated in FIG. 1, the valid broadcasting transmission range of the robot 2 only covers the first beacon device 31, the second beacon device 32 and the third beacon device 33, which can be successfully searched, recorded, ranged and used for navigation. As for other beacon devices 34-39, only when the robot 2 moves and the valid broadcasting transmission range covers these beacon devices 34-39, these beacon devices 34-39 can then be searched, recorded, ranged and used for navigation.

Please refer back to FIG. 2, following the step S26, if the number of the anchor IDs in the configuration list does not reach the threshold number, the tag device 20 further determines whether a first time period is passed (step S28). If the first time period is not passed, it returns back to the step S16. The tag device 20 repeatedly executes the steps S16 to S26 to continuously receive replied initial messages from surrounding beacon devices 3, replies with the control command, and records the anchor IDs of the beacon devices 3.

In this embodiment, when each time the tag device 20 enters the discovery mode, the tag device 20 continues the discovery mode for the first time period, i.e. continuously executing the steps S16 to S26 within the first time period. In other words, even a beacon device like the first beacon device 31 already sends the initial message, if the tag device 20 does not receive the replied initial message of the first beacon device 31 because the bandwidth is occupied by messages from other beacon devices, the tag device 20 cannot successfully finds the first beacon device 31. Therefore, the solution uses the control command in the step S18 to solve the technical problem.

In this embodiment, the first time period is mainly smaller or equals to one second. In a preferred embodiment, the first time period is 0.8 second but this should not be regarded as a limitation.

When the first time period is passed, the tag device 20 exits the discovery mode (step S30). In this example, the tag device 20 mainly exits the discovery mode after the first time period or when the number of anchor IDs in the configuration list reaches the threshold number, but still, this should not be regarded as a limitation. When the tag device 20 exits the discovery mode, if the number of the anchor IDs reaches the threshold number, the robot 2 may continue following tasks. Otherwise, the tag device 20 may wait before entering the discovery mode next time to search other beacon devices 3 so that the number of recorded anchor IDs reaches the threshold number.

Figure 4:
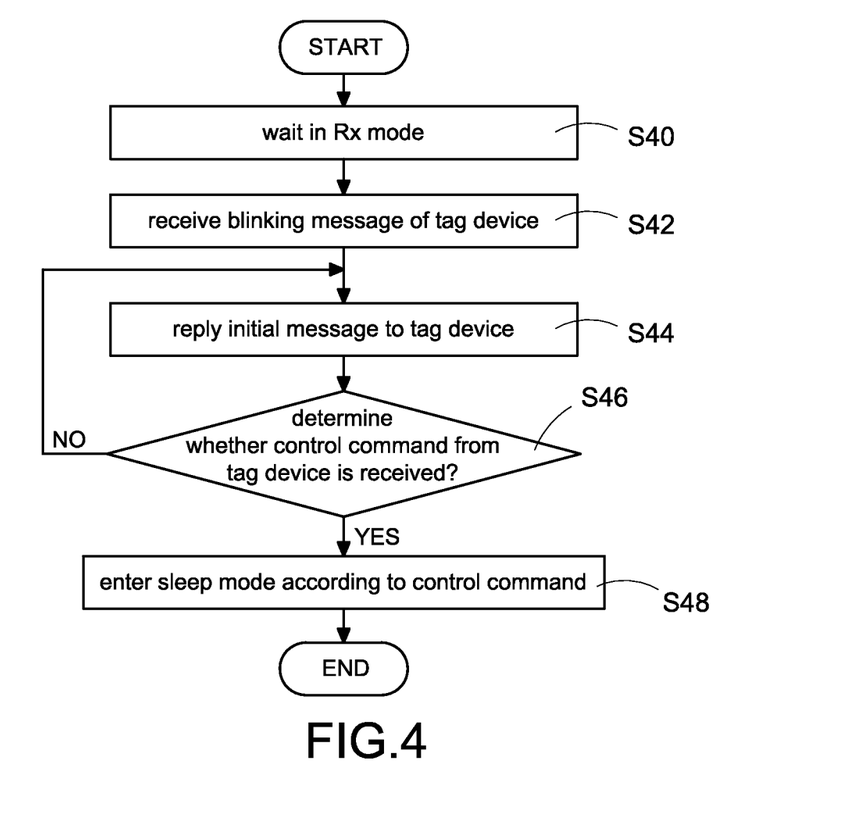
FIG. 4 is a flowchart of beacon device control according to the first embodiment.

Please refer to FIG. 4, which is a beacon device control flowchart of the first embodiment. Multiple beacon devices 3 are disposed in the indoor space 1, but for simplifying explanation, only one beacon device 3 is used as an example.

When the beacon device 3 is started, it enters a receiving mode (Rx mode) by default and continuously waits in the Rx mode (step S40). When the robot 2 is placed or moved to get close to the beacon device 3, i.e. the beacon device 3 being covered within the valid broadcasting transmission range, and the tag device 20 sends the blinking message, the beacon device 3 may receive the blinking message (step S42). When it occurs, the beacon device 3 generates the initial message according to the anchor ID and replies the initial message to the tag device 20 (step S44).

After replying the tag device 20, the beacon device 3 continuously determines whether a control command is received from the tag device 20 (step S46). Before receiving the control command, the beacon device 3 continuously replies the initial message. When the beacon device 3 receives the replied control command from the tag device 20, the beacon device 3 determines that its anchor ID is recorded by the tag device 20, and furthermore enters a sleep mode based on the control command (step S48).

Specifically, in the step S48, the beacon device 3 mainly enters the sleep mode in a second time period according to the control command. Before the second time period is passed, the beacon device 3 does not send the initial messages again. After the second time period is passed, the beacon device 3 wakes up and recovers back to the Rx mode. Unless receiving the blinking message again, the beacon device 3 does not send the initial message again.

In this embodiment, which mainly relies on making the beacon device 3 enters the sleep mode, the problem that the tag device 20 continuously receives the messages from the same beacon device 3, i.e. the beacon device within closer distance, and thus unable to receive messages from other beacon devices 3, i.e. the beacon devices in farther distance is solved. In this embodiment, the second time period is mainly equal to the first time period and is smaller or equal to one second but it should not be regarded as a limitation.

Figure 5:
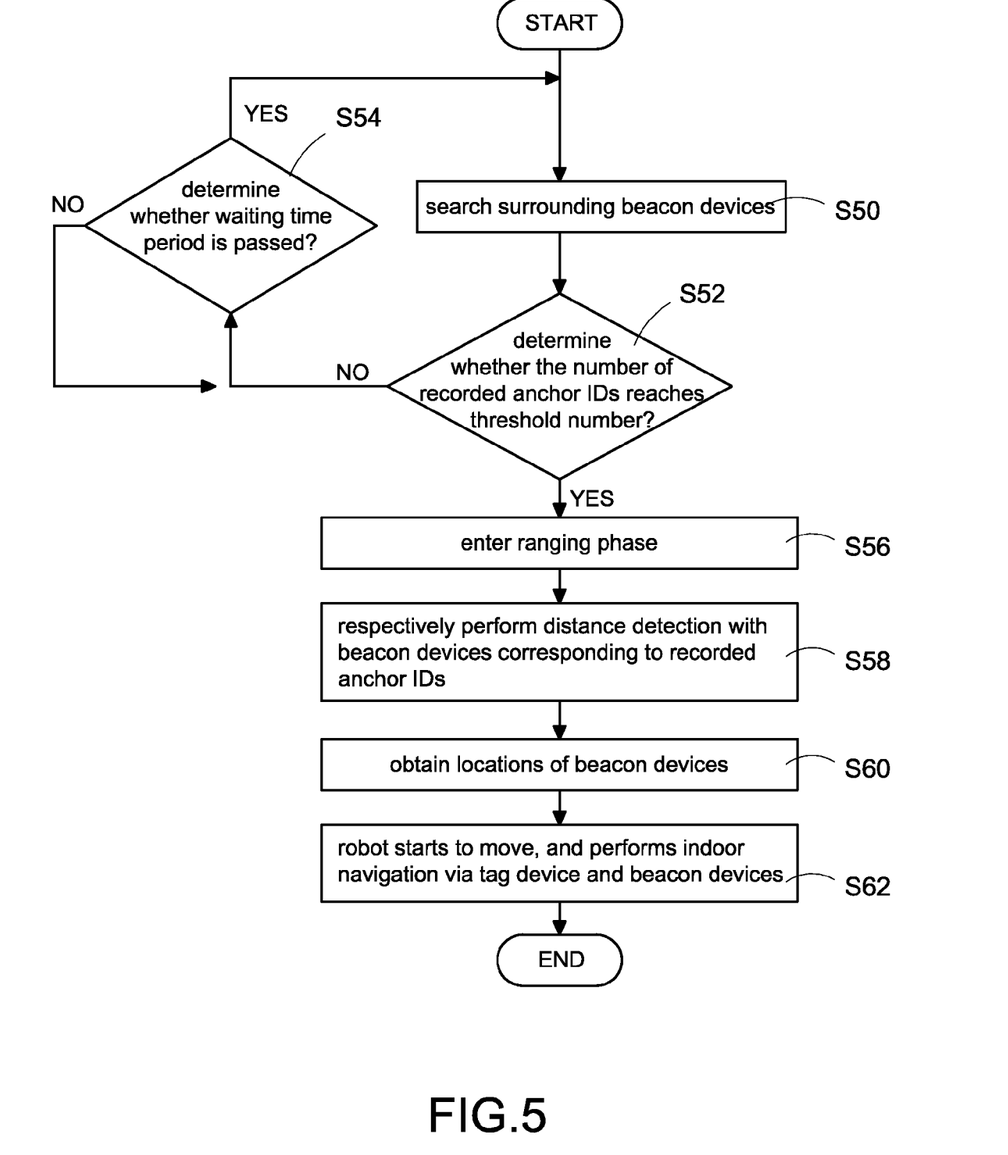
FIG. 5 is an automatic identity recognition flowchart according to the second embodiment.

Please refer to FIG. 5, which is an automatic recognition flowchart of a second embodiment. In this embodiment, the tag device 20 mainly searches one or more surrounding beacon devices 3 (step S50) via the steps S12 to S30 of FIG. 2. The tag device 20 determines whether the number of recorded anchor IDs reaches the threshold number (step S52), i.e. to determine whether the number of recorded beacon devices 3 is sufficient to navigate the robot 2.

If the result in the step S52 is negative, the tag device 20 determines whether a waiting time period is passed (step S54). Before the waiting time period is passed, the tag device 20 does not enter the discovery mode. After the waiting time period is passed, the tag device 20 moves back to the step S50 and searches again with the steps S12 to S30 of FIG. 2.

In this embodiment, the waiting time period is mainly longer than the first time period and the second time period. In a preferred embodiment, the waiting time period is longer than 15 seconds. Specifically, the robot 2 is designed for performing assigned tasks. The tag device 20 stops searching during the waiting time period. Therefore, the waiting time period is designed for the robot 2 to move, navigate and perform different tasks via the tag device 20 and multiple recorded beacon devices 3 in the waiting time period.

As mentioned above, if the first time period is taken as 0.8 second and the waiting time period is 15 seconds, the tag device 20 enters the discovery mode every 15 seconds and continues for 0.8 second. However, this is only an example, and should be regarded as a limitation.

Please refer back to FIG. 5. If the result of the step S52 is positive, the tag device 20 enters a ranging phase after exiting the discovery mode (step S56). When the tag device 20 enters the ranging phase, the tag device 20 perform distance detection respectively with each beacon device 3 corresponding to the anchor ID in the configuration list (step S58), so as to obtain the locations of these beacon devices 3 (step S60). When the tag device 20 already obtains the location of all recorded beacon devices 3, the robot 2 may start to move, which means the first move after the robot 2 is started. Then, the tag device 20 and the beacon devices 3 are used for performing indoor navigation (step S62).

Please be noted that before the robot 2 starts to move, the tag device 20 at least may need to know three locations of surrounding beacon devices 3 to use triangular positioning for navigation. However, if the indoor space 1 is large, the robot 2 may not able to directly search all beacon devices 3 in the indoor space 1 at the starting location of the robot 2, i.e. the location before the first move. Therefore, the tag device 20 may continuously search surrounding beacon devices 3 through counting the first time period and the waiting time period when the robot 2 is moving.

Figure 6:
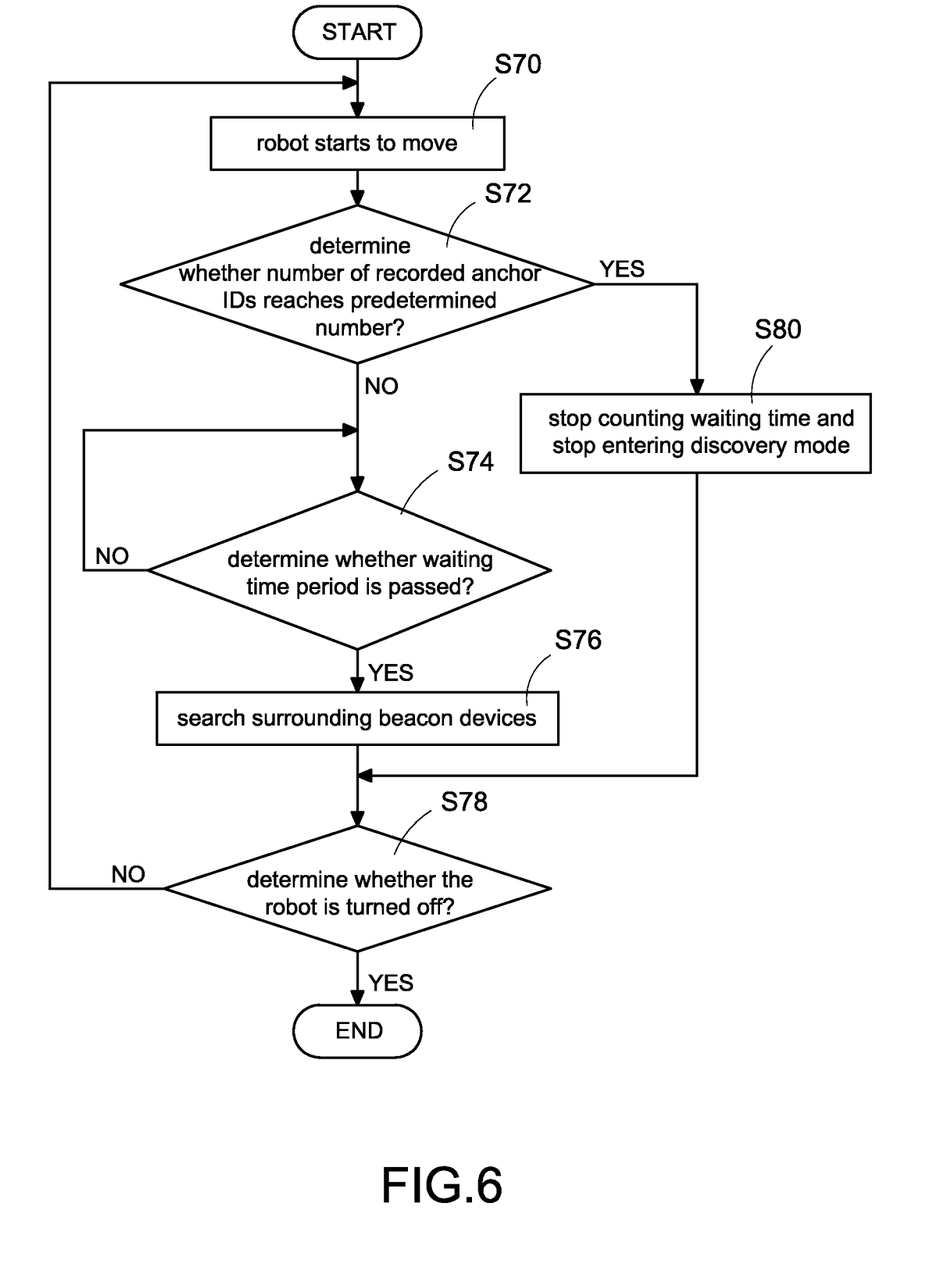
FIG. 6 is an automatic identity recognition flowchart according to a third embodiment.

Please refer to FIG. 6, which is an automatic recognition flowchart of a third embodiment. In this embodiment, a user may set the total number of the multiple beacon devices 3, i.e. the total number of anchor IDs that the configuration list should record, before the robot 2 is started. After the robot 2 starts to move (step S70), the tag device 20 determines whether the number of anchor IDs reaches a predetermined number (step S72). The predetermined number corresponds to the total number of beacon devices 3 that should be recorded.

If the recorded number of anchor IDs in the configuration list does not yet reach the predetermined number, the tag device 20 determines whether the waiting period is passed (step S74), i.e. whether it is ok to enter the discovery mode again.

After the waiting period is passed, the tag device 20 may use the steps S12 to S30 of FIG. 2 to search surrounding beacon devices 3 (step S76) again. In this embodiment, the robot 2 determines whether the power is turned off (step S78). Before it is turned off, the robot 2 repeatedly executes the above mentioned moving, tasks and searching.

A major technical feature includes that if the tag device 20 determines the recorded number of anchor IDs reaches the predetermined number, the tag device 20 stops counting the waiting time period and does not enter the discovery mode again (step S80). Specifically, if the recorded number of anchor IDs reaches the predetermined number, which means the tag device 20 already records all beacon devices 3 in the indoor space 1, the tag device 20 does not need to spend extra time, energy, or processing power to execute unnecessary searching task. Instead, the robot 2 is assisted for navigation and other tasks more efficiently.

However, in alternative embodiments, users may also not set the total number of the beacon devices 3. Instead, the tag device 20 continues to search before the robot 2 is turned off no matter whether all beacon devices 3 in the indoor space 1 are recorded or not.

With the methods mentioned above, the robot may automatically recognize all beacon devices in the indoor space. Furthermore, by instructing recorded beacon devices entering the sleep mode, the time for recording necessary beacon devices for navigating a robot and for the robot to start to move is effectively decreased.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A beacon device automatic identity recognition method used among a robot and a plurality of beacon devices, the robot being disposed with a tag device and the automatic identity recognition method comprising:
   a) entering a discovery mode and sending a blinking message outwardly by the tag device;
   b) receiving an initial message replied from one of the plurality of beacon devices after the beacon device received the blinking message, wherein the initial message comprises an anchor identification (ID) of the corresponding beacon device;
   c) recording the anchor ID in a configuration list when the configuration list not including the anchor ID;
   d) replying a control command to the beacon device that sends the initial message to control the beacon device stopping sending the initial message;
   e) executing the step b) to step d) repeatedly within a first time period; and
   f) exiting the discovery mode after the first time period being passed or the number of the anchor IDs recorded in the configuration list reaching a threshold number.

2. The beacon device automatic identity recognition method of claim 1, wherein the step c) comprising:

c1) determining whether the configuration list recording the anchor ID corresponding to the initial message;
c2) dropping the anchor ID if the configuration list already recording the anchor ID; and
c3) recording the anchor ID in the configuration list when the configuration list not recording the anchor ID.

3. The beacon device automatic identity recognition method of claim 1, wherein the threshold number is a minimal number required for the robot to perform an indoor navigation process.

4. The beacon device automatic identity recognition method of claim 3, wherein the number of the threshold number is three.

5. The beacon device automatic identity recognition method of claim 1, further comprising following steps after the step d):
d01) determining whether the control command being received by the beacon device; and
d02) entering a sleep mode within a second time period based on the control command after receiving the control command.

6. The beacon device automatic identity recognition method of claim 5, wherein the second time period is equal to the first time period.

7. The beacon device automatic identity recognition method of claim 5, wherein the first time period and the second time period are smaller or equal to one second.

8. The beacon device automatic identity recognition method of claim 1, wherein in step a), the tag device sends the blinking message outwardly via a broadcasting technology.

9. The beacon device automatic identity recognition method of claim 1, further comprising the following steps after the step f):

g) determining whether a waiting time period being passed when the number of the anchor IDs recorded in the configuration list not reaching the threshold number;
h) following the step g), repeatedly executing the step a) to the step f) when the waiting time period being passed;
i) entering a ranging phase when the number of the anchor IDs of the configuration list reaching the threshold number;
j) following the step i, separately performing a ranging procedure with the plurality of beacon devices corresponding to the plurality of anchor IDs recorded in the configuration list to obtain the location of each beacon device; and
k) controlling the robot to move and navigating via the corresponding beacon devices.

10. The beacon device automatic identity recognition method of claim 9, further comprising the following steps after the step k):
l) determining whether the waiting time period being passed when the number of the anchor IDs in the configuration list not reaching a predetermined number;
m) following the step l, repeatedly performing the step a) to the step f) after the waiting time being passed; and
n) stopping counting the waiting time period and stopping sending the blinking message when the number of the anchor IDs in the configuration list reaching the predetermined number.

* * * * *